United States Patent [19]

Rauls

[11] Patent Number: 4,600,082
[45] Date of Patent: Jul. 15, 1986

[54] FOLDABLE HUNTING SEAT

[76] Inventor: Richard A. Rauls, 4350 Hammond Dr., Martinez, Ga. 30907

[21] Appl. No.: 753,062

[22] Filed: Jul. 9, 1985

[51] Int. Cl.$^4$ .................. A01M 31/02; A45F 3/26; A47C 9/10
[52] U.S. Cl. .................................. 182/187; 108/152
[58] Field of Search ................ 182/187, 188; 108/152

[56] References Cited

U.S. PATENT DOCUMENTS

| | | | |
|---|---|---|---|
| 3,358,789 | 12/1967 | Laum | 182/187 |
| 3,392,802 | 7/1968 | Moore | 182/187 |
| 3,493,080 | 2/1970 | Ehlert | 182/187 |
| 4,069,891 | 1/1978 | McClung | 182/187 |
| 4,124,094 | 11/1978 | Cande | 182/187 |
| 4,411,335 | 10/1983 | Forrester | 182/187 |

Primary Examiner—Reinaldo P. Machado
Attorney, Agent, or Firm—V. L. Leon; Harry I. Leon

[57] ABSTRACT

A portable seat device which can be mounted on the trunk of a tree to provide a body supporting seat for hunters or the like. The device comprises a frame member with a horizontal bar and a tailpiece which extends generally downwardly from it and which is pivotally connected to a bifurcated arm which supports a seat platform. A pair of pronged support pins each of which is threadedly engaged with a coupler attached to the top of the bar project outwardly from its mid-section and away from a backrest attached to the bar. Straps for encircling the trunk are secured to the front of the bar so that they can be passed over its upper surface and on either side of the couplers. As a first step preparatory to use, the straps are tightened about the girth of a tree while the bulk of the device is held away from it. To increase the tautness on the straps, the lower end of the tailpiece is then rotated downwardly about the pronged ends of the pins; in the process, they dig into the bark, so that when the platform and its supporting arm are fully extended, a very steady seat is achieved.

6 Claims, 4 Drawing Figures

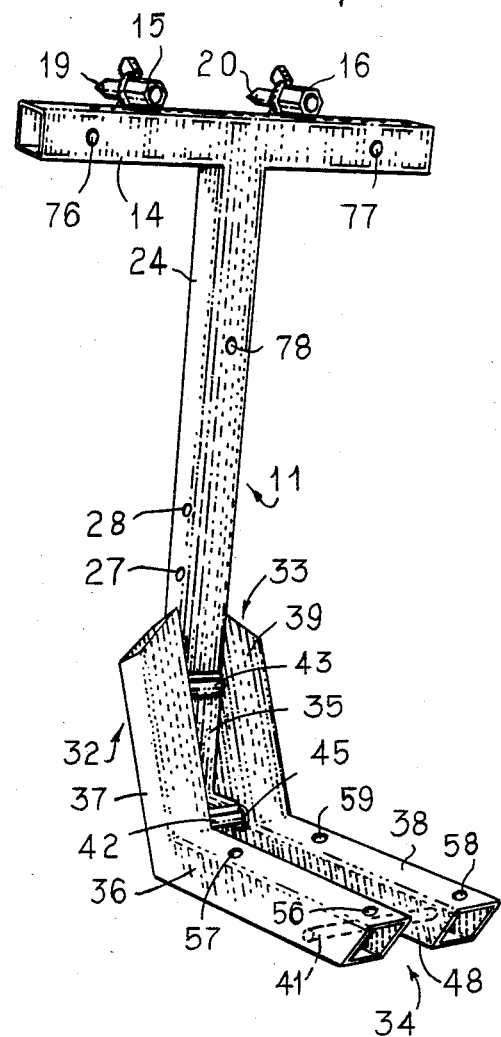
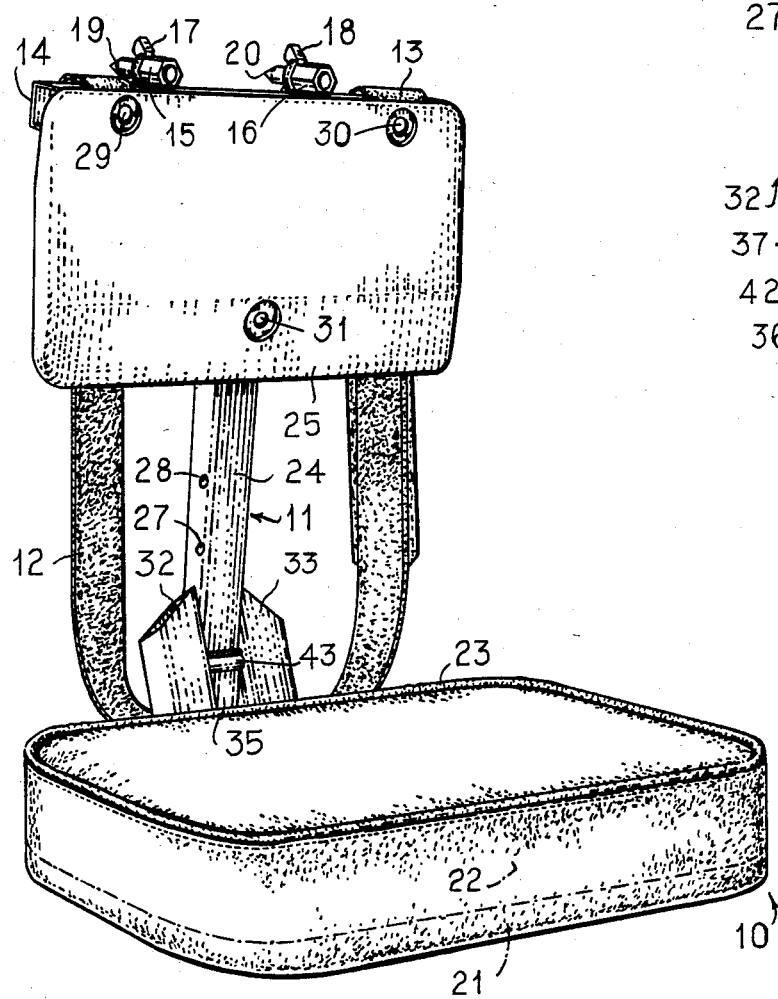

FOLDABLE HUNTING SEAT

BACKGROUND OF THE INVENTION

1. Field of the Invention

This invention relates to the field of sportsman's seats which are quickly mountable and demountable on trees for hunting or other purposes.

2. Description of the Prior Art

Portable hunting seats are known in the prior art and typically comprise a platform abutting the trunk of a tree and supported by a chain wrapped around it, with the front edge of the platform being braced by a strut. Otherwise, such seats tend to slope downwardly from their back edges, thus providing an unstable surface for a user. But even with a pronged end on the strut so that it jabs into the bark, downward slippage is frequently a problem. Some have resorted to using nails to secure the strut or chain as shown in U.S. Pat. No. 3,352,379 or to attaching the chain immediately above a limb as taught in U.S. Pat. No. 3,817,350. The need for such restraints underscores the fact that the length of the supporting chain cannot be varied except in increments of the chain link to accomodate a seat to a variety of trunk sizes. In the past, devices in which the chain is replaced with an adjustable member have been questioned as to their safety because of the possibility of their support means becoming loose in use.

SUMMARY OF THE INVENTION

Accordingly, it is a principal object of the invention to provide a new and improved portable seat device for use by sportsmen and others which has a supporting frame structure of maximum stability and which, when mounted on a tree, results in a negligible amount of damage to its bark.

A further object is to provide a portable seat device which is convenient to carry and easily secured to a tree or vertical wood post.

A still further object is to provide a device having a seat platform which tends to slope downwardly towards the trunk of a tree upon which the device is mounted and having a backrest so that a user can sit comfortably facing either the tree or away from it.

A still further object is to provide a device which includes a foldable arm with locking means for supporting a seat member, the arm holding any position into which it is rotatable without falling downwardly unexpectedly, so that the device can be used in a situation in which an auxiliary platform such as a deer stand is mounted underneath it allowing a user to sit on the device or stand on the platform, alternately.

In accordance with the present invention, there is provided a portable seat device comprising a frame member to the upper surface of which is attached at least one coupler and means for encircling the trunk of a tree including a pair of flexible members. A pronged support pin is threadedly engageable with the coupler and is so positioned that the longitudinal axis of its shaft is generally perpendicular to an elongated tailpiece within the frame member. One end of each flexible member is secured to the frame member so that a portion of the flexible member passes over the upper surface of the frame member and proximate the coupler when the trunk is encircled.

To facilitate the insertion of the pronged end of the support pin into the bark of a tree, means including the elongated tailpiece is provided for increasing tension on the flexible member encircling the trunk. The increase in tension arises continuously and simultaneously with a shifting in the orientation of the shaft of the support pin as the longitudinal axis of the shaft is brought into general alignment with the tension forces on the flexible members, this general alignment being achieved even as the end of the tailpiece distal the support pin is lowered to abut the trunk of the tree. As a consequence of the increased tension and more nearly parallel alignment, the pronged end of the support pin digs into the bark, so that when a seat member and its support arm pivotally connected to the tailpiece are fully extended, a very stable seat structure is achieved.

The arm supporting the seat member further comprises a pair of branches each of which is bent to form two legs disposed at an obtuse angle to each other. The bent branches allow the seat member to be folded against the backrest as an aid in storing, in carrying, and in mounting the device. With it so folded, there is a substantial reduction in the amount of torque which a user must overcome as he holds the tailpiece away from the trunk while he simultaneously applies as much tension as he can to the straps encircling the trunk, thereby facilitating the mounting operation.

Further, the bent branches pivotally connected to the tailpiece and a backstop protruding rearwardly between the upper portions of the branches to abut against the tailpiece when the seat member is fully extended comprise means for positioning the seat member with its upper surface sloping slightly downwardly toward the trunk of the tree when the seat member is fully extended, thereby providing a stable surface on which an individual may sit.

BRIEF DESCRIPTION OF THE DRAWINGS

Further details are explained below with the help of the examples illustrated in the attached drawings in which:

FIG. 1 is a front perspective view of one embodiment of the present invention;

FIG. 2 is a front perspective view of the frame of the invention shown in FIG. 1;

Like reference characters indicate corresponding parts throughout the several views of the drawings.

DESCRIPTION OF THE PREFERRED EMBODIMENT

Figures 3, 4:
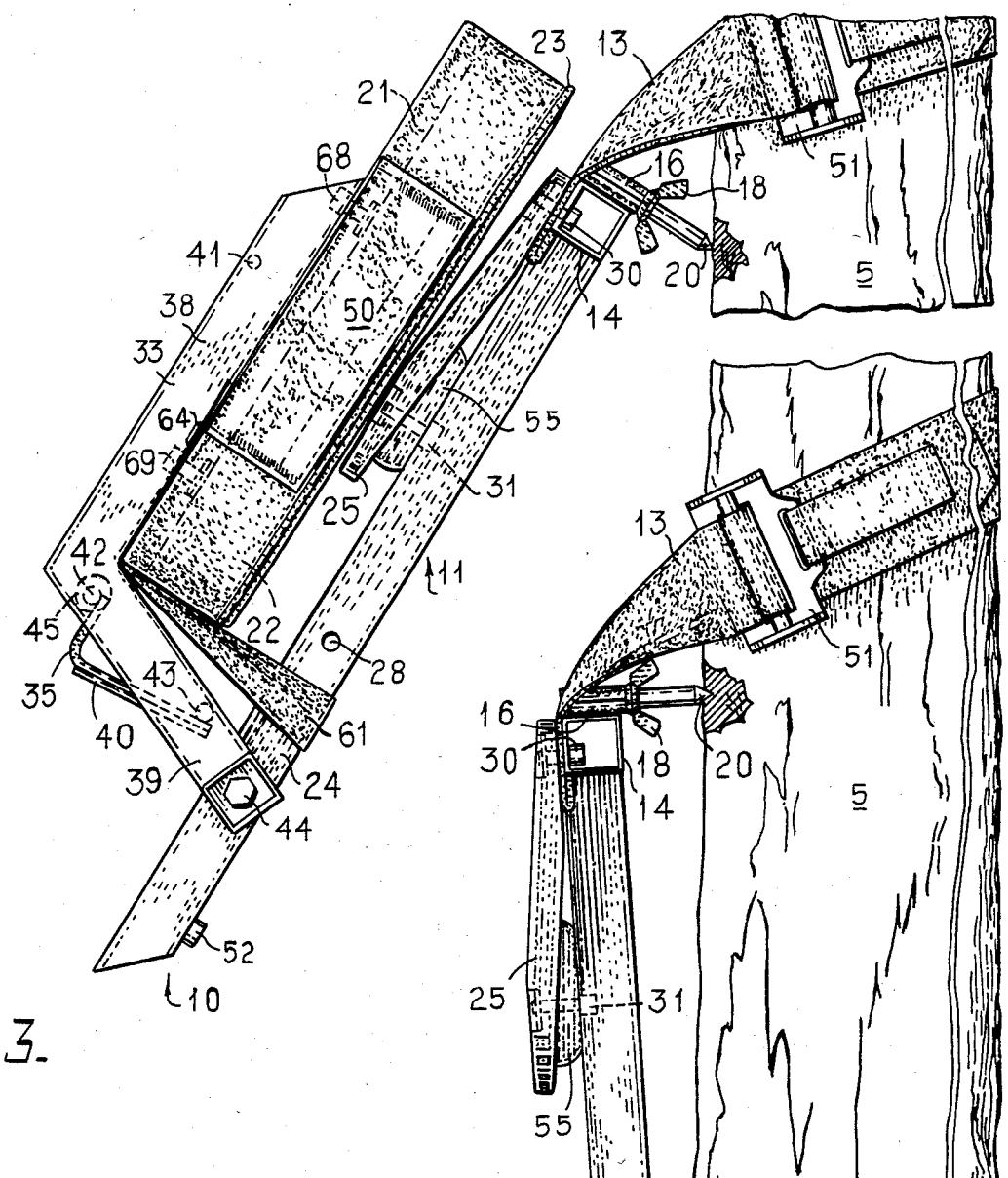
FIG. 3 is a side elevational view of the invention shown in FIG. 1 in which the portable seat device is shown being strapped to a tree.
FIG. 4 is a side elevational view of the same invention shown mounted on a tree.

In the drawings, a portable seat device 10 according to the present invention is shown secured by a pair of flexible members such as the straps 12, 13 to the trunk 5 of a tree. As shown in FIGS. 1-4, the device 10 comprises a frame member 11 having a tailpiece 24 joined to a bar 14 and connected by a pivot pin 44 to a bifurcated support arm 34 having two branches 32, 33 which carry a seat member 23. Atop the bar 14 is rigidly attached a pair of couplers 15, 16. The couplers threadedly engage a pair of support pins 17, 18 each of which has a pronged end 19, 20 directed away from a backrest 25 attached to the front of the frame member 11.

The bar 14, the tailpiece 24, and the branches 32, 33 are each preferably fabricated from aluminum tubing having an angular transverse cross-section which measures, by way of example, approximately one inch square. Each of the branches 32, 33 of the support arm 34 is bent to form two legs 36, 37; 38, 39, respectively, set at an obtuse angle. Preferably, this obtuse angle is within a range of a few degrees of 110°. By employing branches 32, 33 which are so bent, a compact configuration can be achieved to aid in storing, in carrying, or in mounting the device 10 upon folding it with the legs 36, 37 aligned approximately parallel to the tailpiece 24 and with the seat member 23 abutting the backrest 25 (FIG. 3).

In the preferred embodiment, the distance between the legs 36, 37 is set by the length of a cross pin 41; this pin is inserted as far as possible into a pair of holes aligned with each other in the opposing faces 48 of the legs 36, 38 until the pin 41 simultaneously abuts the inner walls of each of these legs. The spacing between the legs 37, 39 is established by a backstop 35 which is rigidly attached by welding or the like to two cross pins 42, 43. Portions of the branches 32, 33 surrounding the holes for receiving the pin 42 are reinforced with washers 45 welded to the branches.

As is illustrated in FIG. 4, the backstop 35 protrudes outwardly between the branches 32, 33 to limit the rotation of the support arm 34 about the pivot pin 44. A flexible strip of rubber or the like affixed to the vertical portion of the backstop 35 is provided to cushion the impact between it and the tailpiece 24. When the arm 34 is fully extended, intersecting lines parallel to the longitudinal centerlines of the tailpiece and of each of the legs 37, 39 form an acute angle which is within a few degrees of 27°. The branches 32, 33 and the backstop 35 which protrudes rearwardly between them to abut against the tailpiece when the seat member 23 is extended only so far as to obtain the preferred angle between the legs 37, 39 and the tailpiece comprise means for positioning the seat member with its upper surface sloping slightly downwardly toward the tree trunk when the seat member is extended in use. Moreover, a pin 52 threadedly engaged with a coupler 53 affixed within the lower portion of the tailpiece 24 extends therefrom; the amount of this extension can be adjusted to compensate for a tree with a slanted trunk and to accomodate individual preferences with respect to the slope of the seat member.

The branches 32, 33 are rotatably connected to the tailpiece 24 by any appropriate means such as a pin 44 which in the preferred embodiment comprises a bolt which has, by way of example, a basic major diameter of 5/16th inch. The branches 32, 33, the tailpiece 24 and the pin 44 are held in assembled relation by a self-locking nut (not shown). The self-locking nut and spacers such as washers or the like juxtaposed between the branches 32, 33 and the tailpiece 24 and encircling the pin 44 facilitate rotation of the arm 34 about the pin 44 with the tension on the nut being adjusted so that the arm stays in any position to which it is rotated without falling downwardly. This feature prevents the arm from striking a person unexpectedly and possibly dislodging him from a deer stand (not shown) or the like mounted under the device 10 and on which he may be standing high above the ground. Moreover, holes 27, 28 disposed along the vertical axis of the tailpiece 24 comprise means for adjusting the height of the seat member 23 in relation to the height of the backrest 25 in order to satisfy the individual user's preference.

The seat member 23 includes a platform 21 which may be fabricated from ½ inch thick, 5-ply plywood or the like and a cushion 22 preferably formed of water-resistant foam rubber and protected by a cover of nylon or of a similar material. The cover may be decorated to aid in camouflaging the presence of the device 10. The platform 21 is secured to the support arm 34 by fasteners such as hexagon socket head cap screws 68, 69. Holes 56, 57, 58, 59 in the arm 34 are provided for receiving the screws 68, 69; the platform 21, arm 34 and screws 68, 69 are held in assembled relation by T nuts.

Similarly, the backrest 25 may be fabricated from ½ inch thick plywood and secured to the bar 14 and the tailpiece 24 in which are formed holes 76, 77, 78 for receiving the cap screws 29, 30, 31, respectively. Recesses in the backrest 25 are provided for the T nuts which hold the screws 29, 30, 31 in place. A wedge 55 juxtaposed between the backrest 25 and the tailpiece 24 is employed to position the bulk of the surface of the backrest 25 approximately perpendicularly to the upper surface of the seat member 23 so that a user may comfortably lean against the backrest 25.

The cap screws 29, 30 also hold the straps 12, 13 in place between the front of the bar 14 and the backrest 25. The straps 12, 13 are preferably formed of a polyester or similar material and have a marked degree of surface ribbing. Ribbing on the free end of the strap 12 interacts with knurling on the slidable bar within a buckle 51 attached to the strap 13 when the strap 12 is wound about this bar. This intersection helps to prevent any loosening of the straps 12, 13 in use.

When the device 10 is being carried in the field, the support pins 17, 18 are preferably disengaged from the couplers 15, 16 and inserted in the pocket 50. Further, the pin 52 may be employed to mount a plate (not shown) to which are connected a pair of straps, one of which is buckle-equipped and both are otherwise similar to the straps 12, 13. With each strap 12, 13 buckled to one of the pair of straps attached generally below it to the plate, the device 10 can be carried as a backpack. Alternatively, it can be transported, slung under one arm or over a shoulder or strapped to a deer stand.

In addition, a strap 61 may be employed during transport and mounting operations to retain the device 10 in a folded configuration with the seat member 23 abutting the backrest 25 (FIG. 3). In the preferred embodiment, both ends of the strap 61 are connected to the base of the seat platform 21 with at least one end of this strap having a snap cap 64 removably attached to a snap base 54. Keeping the seat member 23 and the frame member 11 folded together with the use of the hold-down strap 61 reduces the degree of awkwardness and the amount of torque which a user must overcome while he is attempting to hold the tailpiece 24 away from the trunk of a tree in order to mount the device 10 on it as is explained further hereinbelow.

At the desired surveillance site, the device 10 is mounted on a tree at a height which is typically between 2 and 40 feet above ground level. To facilitate climbing a tree with the device 10, a user may join the strap 12 to the buckle-equipped strap 13 so as to form a loop which he can then hang about his neck. Another option is for him to pull up the device with a rope after himself.

Once the hunting seat is at the desired height, the strap 12 is wrapped about the girth of the tree. The user then pulls the free end of the strap 12 through the buckle 51 and, in the process, puts as much tension as he can on the straps 12, 13 while he simultaneously holds the bulk of the device away from the trunk. The approximate slope at which the tailpiece 24 is held relative to the trunk immediately prior to its lowering is shown in FIG. 3. The straps 12, 13 may also be positioned generally downwardly of the support pins 17, 18 at this stage; such an alternate configuration is preferable when it is desired that the pin 52 remain in contact with the trunk even when the arm 34 is folded upwardly in any intermediate position.

As the distal end of the tailpiece 24 is then rotated downwardly about the pronged ends 19, 20, the straps 12, 13 are stretched more taut; and the longitudinal axes of the shafts of the support pins 17, 18 shift from being oriented downwardly at an acute angle to the trunk to being oriented upwardly at an angle slightly greater than 90°. This is provided means for increasing the tension on the straps 12, 13 using the tailpiece 24 as a lever arm while simultaneously positioning the shafts of the support pins so that they are progressively aligned more nearly parallel to the direction of the composite of the tension forces on the straps, thereby causing the pronged ends 19, 20 of the support pins to dig into the bark. Moreover, this tension increasing and aligning means comprises the same frame member 11 employed to support the backrest 24 and an arm 34 on which the seat member 23 rests. Thus the frame member 11 serves a dual function resulting in an economy of weight.

Among the accessory items (not shown) which may be attached to the base of the seat platform 21 or the branches 32, 33 are a seat belt and means for carrying a jacket or raincoat and a thermos, including elastic cords or straps having hooks at both ends for catching upon holes formed in the platform or the sides of the branches.

It will be understood that the invention is not limited to the embodiments disclosed, but is capable of numerous rearrangements, modifications, and substitutions without departing from the scope of the invention.

What is claimed is:

1. A portable seat device for attachment to and temporary use on the trunk of a tree, comprising:
  (a) a frame member having at least one coupler attached to the upper surface thereof and an elongated tailpiece;
  (b) at least one support pin with a pronged end, the pin being threadedly engageable with the coupler, the longitudinal axes of the shaft of the pin and of the tailpiece being disposed generally perpendicularly to each other;
  (c) means pivotally connected to the tailpiece proximate the end thereof which is distal the coupler for supporting a seat member;
  (d) means for encircling the trunk including a pair of flexible members, one end of each flexible member being attached to a side of the frame member which is distal the support pin, a portion of each flexible member being positioned to pass over an edge between said side and said upper surface of the frame member proximate the coupler when the trunk is encircled, the edge being disposed generally downwardly of the longitudinal axis of the shaft of the support pin but at a distance from the support pin which is less than the distance from its pronged end to an imaginary line which intersects the edge, said line being disposed parallel to the longitudinal axis of the tailpiece; and
  (e) means including the elongated tailpiece for increasing the tension on the flexible members while they are encircling the trunk, a net increase in tension arising with a shifting in the orientation of the shaft of the support pin as the longitudinal axis of the shaft is brought into general alignment with the direction of the composite of the tension forces on the flexible members; during said shifting, the longitudinal axis of the shaft of the support pin being initially oriented downwardly at a first acute angle with respect to the trunk of the tree and then oriented upwardly with respect to its longitudinal centerline at a second acute angle which is at least a few degrees less than 90° when the distal end of the tailpiece has been rotated downwardly as far as possible about the pronged end of the support pin, thereby facilitating the insertion of the pronged end into the bark of the tree and the retention of the distal end of the tailpiece proximate the trunk once the tailpiece has been so rotated.

2. A portable seat device for attachment to and temporary use on the trunk of a tree, comprising:
  (a) a frame member having at least one coupler attached to the upper surface thereof and an elongated tailpiece;
  (b) at least one support pin with a pronged end, the pin being threadedly engageable with the coupler, the longitudinal axes of the shaft of the pin and of the tailpiece being disposed generally perpendicularly to each other;
  (c) means for encircling the trunk including a pair of flexible members, one end of each flexible member being attached to a side of the frame member which is distal the support pin, a portion of each flexible member being positioned to pass over said upper surface of the frame member proximate the coupler when the trunk is encircled;
  (d) means including the elongated tailpiece for increasing the tension on the flexible members while they are encircling the trunk, the increase in tension arising with a shifting in the orientation of the shaft of the support pin as the longitudinal axis of the shaft is brought into general alignment with the direction of the composite of the tension forces on the flexible members, thereby facilitating the insertion of the pronged end of the support pin into the bark of the tree; and
  (e) a bifurcated arm for supporting a seat member, the arm being pivotally connected to the tailpiece and having a pair of branches each of which is bent to form two legs disposed at an obtuse angle to each other; the lower leg of each branch being attached to the seat member and alignable generally parallel to the tailpiece, so that when said lower legs and the tailpiece are so aligned, there is a substantial reduction in the amount of torque acting about the pronged end of the support pin when the shaft of the support pin is oriented downwardly at an acute angle to the trunk than would otherwise exist, thereby facilitating the operation of putting tension on the flexible members.

3. The portable seat device according to claim 2 which further comprises means for positioning the seat member with the bulk of the upper surface thereof having a slightly downward slope towards the trunk of the tree when the device is mounted in use, the positioning means including a backstop which protrudes rearwardly between the upper legs of the branches and which abuts against the tailpiece when the bifurcated arm is fully extended, thereby providing a stable surface on which to sit.

4. A portable seat device for attachment to and temporary use on the trunk of a tree, comprising:
   (a) a frame member having at least one coupler attached to the upper surface thereof and an elongated tailpiece;
   (b) at least one support pin with a pronged end, the pin being threadedly engageable with the coupler, the longitudinal axes of the shaft of the pin and of the tailpiece being disposed generally perpendicularly to each other;
   (c) means for encircling the trunk including a pair of flexible members, one end of each flexible member being attached to a side of the frame member which is distal the support pin, a portion of each flexible member being positioned to pass over said upper surface of the frame member proximate the coupler when the trunk is encircled;
   (d) means including the elongated tailpiece for increasing the tension on the flexible members while they are encircling the trunk, the increase in tension arising with a shifting in the orientation of the shaft of the support pin as the longitudinal axis of the shaft is brought into general alignment with the direction of the composite of the tension forces on the flexible members, thereby facilitating the insertion of the pronged end of the support pin into the bark of the tree; and
   (e) an arm for supporting a seat member, the arm being pivotally connected to the tailpiece and having at least one branch which is bent to form two legs disposed at an obtuse angle to each other, the lower leg of the branch being attached to the seat member and alignable generally parallel to the tailpiece, so that when said lower leg and the tailpiece are so aligned, there is a substantial reduction in the amount of torque acting about the pronged end of the support pin when the shaft of the support pin is oriented downwardly at an acute angle to the trunk than would otherwise exist, thereby facilitating the operation of putting tension on the flexible members.

5. The portable seat device according to claim 4 which further comprises means for positioning the seat member with the bulk of the upper surface thereof having a slightly downward slope towards the trunk of the tree when the device is mounted in use, the positioning means including a backstop which protrudes rearwardly of a lower section of the upper leg of the branch and which abuts against the tailpiece when the arm if fully extended, thereby providing a stable surface on which to sit.

6. The portable seat device according to claim 1 wherein the longitudinal axis of the tailpiece is further characterized as diverging downwardly and rearwardly from a line perpendicular to the bulk of the upper surface of the seat member when it is fully extended, by a third acute angle which is greater in measure than is the complement of the second acute angle, so that the bulk of the upper surface of the seat member has a slightly downward slope towards the trunk of the tree when the device is mounted in use, thereby providing a stable surface on which to sit.

* * * * *